(12) United States Patent
Schneider et al.

(10) Patent No.: US 6,747,076 B2
(45) Date of Patent: Jun. 8, 2004

(54) FURFURYL ALCOHOL AND LIGNIN ADHESIVE COMPOSITION

(75) Inventors: Marc H. Schneider, New Brunswick (CA); Jonathan G. Phillips, New Brunswick (CA)

(73) Assignee: The University of New Brunswick, Fredericton (CA)

( * ) Notice: Subject to any disclaimer, the term of this patent is extended or adjusted under 35 U.S.C. 154(b) by 297 days.

(21) Appl. No.: 10/083,490

(22) Filed: Feb. 27, 2002

(65) Prior Publication Data

US 2002/0173564 A1 Nov. 21, 2002

Related U.S. Application Data

(60) Provisional application No. 60/271,540, filed on Feb. 27, 2001.

(51) Int. Cl.⁷ .......................... B05D 3/12; C08G 75/00; C08G 83/00; C08H 5/04; C08J 89/00
(52) U.S. Cl. .............................. 524/13; 527/103; 528/1; 528/2; 427/184; 427/189; 427/208; 427/208.2; 428/58; 428/102; 428/143; 428/145
(58) Field of Search ........................... 524/13; 527/103; 528/1, 2; 427/184, 189, 208, 208.2; 428/58, 102, 143, 145

(56) References Cited

U.S. PATENT DOCUMENTS

| 2,432,890 A | * | 12/1947 | Hersh ........................... 524/13 |
|---|---|---|---|
| 2,470,394 A | * | 5/1949 | Glycofrides .................. 524/13 |
| 3,919,127 A | | 11/1975 | Larsen |
| 3,927,139 A | * | 12/1975 | Bozer et al. ................... 526/89 |
| 3,975,318 A | | 8/1976 | Larsen |
| 3,975,319 A | | 8/1976 | Larsen |
| 4,183,997 A | | 1/1980 | Stofko |
| 4,226,982 A | | 10/1980 | Blount |
| 4,328,136 A | | 5/1982 | Blount |
| 4,357,194 A | | 11/1982 | Stofko |
| 4,474,636 A | | 10/1984 | Bogner |
| 4,524,164 A | | 6/1985 | Viswanathan |
| 4,769,434 A | | 9/1988 | Van der Klashorst |
| 5,288,774 A | | 2/1994 | Gardziella |
| 6,331,339 B1 | | 12/2001 | Kajander |

FOREIGN PATENT DOCUMENTS

| CA | 409226 | 12/1942 |
|---|---|---|
| CA | 1128241 | 7/1982 |

\* cited by examiner

*Primary Examiner*—Nathan M. Nutter
(74) *Attorney, Agent, or Firm*—Jones, Tullar & Cooper, P.C.

(57) ABSTRACT

A wood adhesive formulation containing furfuryl alcohol, lignin, maleic anhydride, and iron and zinc catalysts.

35 Claims, No Drawings

FURFURYL ALCOHOL AND LIGNIN ADHESIVE COMPOSITION

This application is based on a U.S. Provisional Patent Application which is application Ser. No. 60/271,540, and the official filing date is Feb. 27, 2001. The title of the Application is: "Furfuryl Alcohol—Lignin Wood Adhesive, Fiber Reinforced Material Matrix Compound and Porous Material Surface Reinforcing Compound".

BACKGROUND OF THE INVENTION

The present disclosure relates to a novel and economical process for preparing bonded wooden substrates using an adhesive formulation based on a by-product obtained from a chemical pulping process. The adhesive formulation, which is novel and also forms part of the present invention, contains two parts, a reactive component and a catalyst component. When the two parts are mixed together and heated under pressure, they produce a strong, persistent bond.

The process of the present disclosure differs from processes commonly known in the arts to produce bonded wooden substrates. The wooded substrates are not pretreated with a chemical prior to bonding. It is not preferred to have a pretreatment step because it is an extra and expensive operation. Also, the chemical pretreatment is often performed with a substance having a low pH. Such acidic substances can cause degradation of the wood and weakening of the adhesive bond. The present process therefore avoids any chemical pretreatment of the wood prior to bonding.

The present process also differs from processes in the prior art in that the adhesive formulation contains a synergistic mixture that allows for spreading and assembly before curing, but cures very quickly upon heating. This allows for the preparation of a strong chemical bond, because the adhesive formulation is prevented from penetrating too deeply into the wood. A strong bond is therefore formed before the glue line is starved.

It is also an advantage of the present invention to employ a by-product from a chemical pulping process which is usually discarded as a waste product. Lignin is the intercellular material which binds together wood fibers to make solid wood. Lignin also stiffens the cell wall of the wood. Chemical pulping processes break down the lignin to release the wood fibers, the lignin being solubilized and removed, at least in part. The final product is a useful wood fiber pulp and a waste by-product of lignin in water or an organic solvent. There has been an ongoing search for new uses of lignin because of the large volumes of chemical pulp produced in the world. To this date, there have been limited opportunities for upgrading dissolved lignin.

Lignin is an adhesive in its natural state. Since dissolved lignin has reactive groups that should allow it to react in adhesive formulations, lignin has been employed in various wood adhesive formulations. Usually the lignin is employed simply as an extender in adhesives based on phenol-formaldehyde and the like.

U.S. Pat. No. 5,288,774, issued to Gardziella et al, relates to a refractory molding composition containing a novel binding agent. The binding agent is a lignin-furan resin mixture, the lignin being sulfur-free and having a low molecular weight. The furan resin is preferably a co-condensation resin of furfuryl alcohol and at least one member selected from the group consisting of formaldehyde and urea. The binding agents produced from these resin mixtures split off formaldehyde in the curing process to a greatly reduced extent in comparison to conventional furfuryl alcohol-formaldehyde resins and they are therefore not only more economical but also not harmful to the environment since the formaldehyde content at the workplace can be considerably lowered through the use of the raw material lignin.

U.S. Pat. No. 4,474,636, issued to Bogner, relates to novel binder compositions useful in the fabrication of composite articles such as fiber reinforced composite articles. In a most preferred embodiment, the resin binders for fabricating glass-reinforced laminates are furfuryl alcohol homopolymers, diluted with hydroxymethyl furfural. Also, the binder compositions have excellent strength characteristics and can be used advantageously in the manufacture of pressure molded medium or high density composite articles such as particle board, wafer board, oriented fiberboard, mat board, hardboard, pressboard, fiberglass board, and the like. The binder compositions can also be used in the manufacture of low density non-molded composite articles such as acoustical tile and thermal insulating mats or boards.

U.S. Pat. No. 4,357,194, issued to Stofko, relates to a method of bonding solid lignocellulosic materials with an adhesive-free bonding material comprising at least one sugar, starch or mixture thereof. The method includes the step of using live steam to heat the interior of the solid lignocellulosic material to a temperature of about 320° F. to about 420° F. The live steam activates phenolic material on the surfaces of the solid material, the activated phenolic material then reacting with the sugar, starch or mixture thereof. The phenolic material is preferably a lignin. In a preferred embodiment, the adhesive-free bonding material is a mixture of molasses and sulfonated lignin.

U.S. Pat. No. 4,183,997, issued to Stofko, relates to a method of bonding solid lignocellulosic materials with an adhesive-free bonding composition having a specified pH and containing sugar, starch or mixtures thereof. The adhesive-free composition also contains an alkaline buffering agent and a suitable catalyst. A suitable catalyst is zinc chloride.

U.S. Pat. No. 4,769,434, issued to Van der Klashorst et al, relates to a polymeric material which contains a reaction product from grass plant lignin derivatives. Lignin polymer fragments which have been recovered from black liquor obtained in the pulping of grass plant material are reacted with an electrophilic compound capable of reacting twice at one site or at least once at each of two different sites of the compound. The polymeric material is substantially the result of a cross-linking of the various lignin fragments by the electrophilic reactant. In a preferred embodiment, the electrophilic reactant is an aldehyde. The polymeric material can be employed as an adhesive used in the manufacture of wood products such as particle board, plywood, finger joints and the like. A filler such as nut shell flour can be included in the adhesive.

Canadian Pat. No. 409,226, issued to Marathon Paper Mills Company, relates to a resin product which is prepared by reacting furfuryl alcohol with a partially desulfonated lignin-sulfuric acid.

Canadian Pat. No. 1,128,241, issued to Holmens Bruk A B, Sweden, relates to a method of producing an adhesive for wood products. In the method, a waste product containing sugar and lignin is heated in a strongly acidic environment. This step gives a reaction mixture containing furfural derivatives. The reaction mixture is then further reacted to give a reaction product between the furfural derivatives and the lignin, the reaction product being an adhesive binder containing the condensation products of lignin and furfural derivatives.

DETAILED DESCRIPTION OF THE INVENTION

The preferred process for producing the bonding wooden substrates employs a novel adhesive formulation which is a two-part composition which can be mixed and used as a wood adhesive. The two-part composition comprises: (a) a reactive component comprising furfuryl alcohol monomer and a by-product obtained from a chemical pulping process, and (b) a catalyst component comprising zinc chloride, iron (III) chloride hex hydrate and maleic anhydride. The by-product is a polymer mixture comprising lignin and a liquid solvent. The liquid solvent is selected from water, an organic solvent and mixtures thereof. Typical organic solvents are hydrocarbons, ethers, alcohols and the like.

The lignin can be obtained from the wood of coniferous trees a well as lignin obtained from the wood of deciduous trees. In a preferred embodiment, the lignin can be obtained from the organosolve process under comparatively mild conditions, since its chemical structure has only slightly been changed through the effect of the processing conditions.

The process of the present invention comprises the steps of; obtaining two or more wooden substrates; coating at least one of the wooden substrates with the two-part adhesive formulation disclosed above; contracting the at least one coated substrate with a second wooden substrate to obtain a bondable wooden structure; and heating the bondable wooden structure, optionally under pressure, to obtain a bonded wooden structure. In a preferred embodiment, the heating step is performed in a hot press under suitable conditions of temperature and pressure.

The wooden substrate can be selected from a variety of well-known products. Some examples of these products are: lumber, veneer, plywood, wood wafers and wood particles and wood fibres.

In a preferred embodiment, the two-part adhesive composition comprises lignin in an amount of about 10% to about 30% by weight. The furfuryl alcohol monomer is present in an amount of about 30% to about 50% by weight. The maleic anhydride component, which acts both as part of the catalyst complex and also as a coupling agent to enhance bonding to the wood, is present in an amount of about 5% to about 15% by weight.

The zinc chloride is present in an amount of about 0.5% to about 5% by weight. The iron (III) chloride hexahydrate is present in an amount of about 0.5% to about 5% by weight.

The catalyst component can also contain nut shell flour and methanol. The nut shell flour can be present in an amount of about 5% to about 20% by weight.

In another preferred embodiment, the novel adhesive formulation can be a one-part composition comprising: furfuryl alcohol monomer, a by-product obtained from a chemical pulping process, zinc chloride, iron (III) chloride hexahydrate and maleic anhydride. The by-product contains lignin. The one-part composition can also contain nut shell flour and a solvent such as methanol.

According to one embodiment of the invention, wooden surface to be bonded are covered either by a continuous or discontinuous film, eg., by a mist of droplets, of an adhesive formulation comprising furfuryl alcohol monomer, a lignin containing by-product obtained from a chemical pulping process, zinc chloride, iron (III) chloride hexahydrate, maleic anhydride and, optionally, nut shell flour and a solvent such as methanol. The so coated surfaces are brought into contact with other wooden surfaces, themselves either similarly coated or not, and the so contacting surfaces are consolidated by heat and pressure for a time sufficient to effect the bonding by chemical transformation reaction of the components.

While the invention is described in relation to the bonding of wooden (lignocellulosic) materials, it will be understood that bonding formulations, containing furfuryl alcohol and/or polymerized furfuryl alcohol resin along with a lignin material and various catalytic agents as described above, can also be used for the bonding of a wide variety of materials such as glass and other mineral fibers, foundry sands, rubber, synthetic polymers and many other substances, either by themselves or in admixture with one another or in admixture with lignocellulose. An example of a product formed from material other than wood is a flexible, stress-resistant composite mat prepared from glass fibers and the herein described adhesive formulation.

Adhesive compositions for use in the present invention and containing furfuryl alcohol and/or furfuryl alcohol resin, a lignin-containing by-product material and catalytic agents as described above, can be applied to the surfaces to be bonded in a variety of ways. For example, such compositions can be used in liquid form such as in water solution-suspension, or in powder form. Liquid formulations can be applied either hot or cold, and the surfaces to be bonded can also be either hot or cold.

As sources of lignin there can be used any kind of lignin containing material such as spent sulfite liquor or kraft spent liquor produced as wastes or by-products in pulping wood, or lignin from wood alcoholysis, phenolysis or hydrolysis.

The adhesive compositions may also contain other optional materials including other chemical reagents capable of affecting the bonding reaction, eg., accelerating agents, retarding agents, plasticizes, cross linking agents and the like.

The amount of bonding composition to be used is also subject to considerable variation, depending on the nature of the product, the surface roughness and the desired properties of the product. In production of wood laminates such as plywood, the quantity of bonding composition will range between about 2 and about 50 grams of mixed solids per 1,000 $cm^2$ of the surface to be bonded. In the production of composite products such as particle board or fiber board, the quantity of bonding composition on dry basis will be between about 1% and 25% of solids in the composition to 100% dry weight of substrate, depending on the desired final properties.

Conditions in the hot press may also vary widely depending on a number of variables, such as the type of lignin, type of wood, presence or absence of optional materials, and requirements of the product. As is usual in the pressing of wood products, the lower the temperature the longer the press time required, and vice versa. In general, the preferred temperature range is about 140° C. to about 250° C. The pressing time required under these conditions is the time needed to raise the temperature in the center of the product to a level of about 150° C. to about 220° C.

Lignin is the most abundant natural aromatic organic polymer found in all vascular plants. Lignin is composed of coniferyl, p-coumaryl and sinapyl alcohols. This invention relates to the utilization of lignin derivatives produced as waste products in the pulping industry. Large tonnages of such materials are produced during the chemical pulping of wood and other plant material, but they have been used principally only for their combustion value in the formation of an incinerator product from which pulping chemicals can be recovered. In some cases the black liquor containing the lignin derivatives and spent pulping chemical is simply discarded into rivers and the sea, causing a pollution problem.

It has been proposed to utilize the lignin derivatives contained in black liquors obtained from the pulping of hardwoods and softwoods both by the sulphite and alkali pulping processes, but as yet no major commercial use of the waste products has transpired. The principal direction of investigation of uses for lignin derivatives has been in the polymer field, lignins being high molecular weight compounds formed by the biosynthetic polymerization of certain closely related phenyl-propenol precursors. During pulping the lignin polymers are broken down to provide the lignin derivatives which are by nature degradation products comprising lignin polymer fragments incorporating phenyl propane units which may present reactive sites through which re-polymerization reactions can occur.

Much work has been directed at the separation of alkali lignin and lignosulfonate degradation products from black liquors, and the reaction of these with aldehydes for the formation of phenol-formaldehyde type resins and adhesives. This has included the partial substitution of the phenol by the lignin derivatives, but without a satisfactory product having been achieved. It is believed that the main reason for the lack of success is the poor reactivity of the lignin polymer fragments due to the insufficient number of sites on each fragment which are reactive with formaldehyde. The poor reactivity manifests itself in unsatisfactory cross linking in a proportion of the lignin fragments which results in poor adhesive properties.

During alkaline pulping the lignin macromolecule is degraded by cleavage of base labile ether bonds. The cleavage of aryl ether bonds results in the formation of phenols which exist as phenolate salts under the alkaline conditions during pulping and render the lignin fragments soluble. A decrease of the pH to below the pH value of the phenol reverses the dissociation of the lignin phenol groups and the lignin precipitates from the solution.

Preferably, the two-part adhesive composition is prepared as follows. The reactive component of the composition is prepared by forming a solution of methanol, zinc chloride and iron (III) chloride hexahydrate. An amount of furfuryl alcohol (2-hydroxymethyl furan) is added to this solution. The solution is then heated under conditions suitable for polymerizing the furfuryl alcohol. The polymerized product should have a viscosity of about 800 centipoises. To this polymerized product is added the lignin-containing by-product and walnut shell flour. The so-obtained reactive component can then be activated by addition of the catalyst component prior to hot pressing. Ingredients of the catalyst component are: maleic anhydride, zinc chloride and iron (III) chloride hexahydrate. In an alternative embodiment, the two-part adhesive composition is prepared by obtaining a reactive component as follows. A lignin-containing by-product is mixed with furfuryl alcohol monomer. To this mixture is added a solution of maleic anhydride in methanol. The ratio of maleic anhydride to furfuryl alcohol, based on weight, is about 1:25. The entire mixture is then heated at a temperature of about 75° C. to obtain a resin composition having a viscosity of about 200 centipoises. The so-obtained reactive component can then be activated by addition of the catalyst component prior to hot pressing, Ingredients of the catalyst component are: maleic anhydride, zinc chloride and iron (III) chloride hexahydrate.

The invention will be illustrated in greater detail by the specific examples which follow, it being understood that these preferred embodiments are illustrative of, but not limited to, procedures which may be used in the production of adhesively bonded wood products. Parts and percentages are by weight unless otherwise indicated.

EXAMPLE 1

Three popular veneer panels, each having a thickness of 4 min., were obtained. The surface of one of the panels was coated on both sides with an adhesive composition having a reactive component and a catalyst component. The basic formulation of the reactive component was: furfuryl alcohol monomer (43% by weight), lignin (22% by weight). The basic formulation of the catalyst component was: zinc chloride (2% by weight, iron (III) chloride hexahydrate (2% by weight), maleic anhydride (10% by weight), nut shell flour (11% by weight), and solvent (9% by weight).

After coating, the three poplar veneer panels were contacted in such a manner that the panels with the adhesive coating was between two uncoated panels. The three-panel structure was then removed to a hot press which was maintained at a pressure of 1.2 mPa and a temperature of 150° C. The hot pressing continued for a time of seven minutes, at the end of which time the panel structure was removed from the hot press and allowed to cool.

To test the bonding quality, ten samples of 2.54 cm. Square area were cut from the panel structure and submitted to bond quality tests employing the U.S. National Bureau of Standards Voluntary Product Standard PS 1-83 for Construction and Industrial Plywood. Each of the samples was pulled apart by tension, subjecting the central square test area to rolling shear. The maximum load and amount of wood failure was recorded. Five of the samples were tested dry, and five of the samples were tested wet. The wet samples were boiled in water for 4 hours, dried, boiled again in water for 4 hours, and given a final drying.

The results of the test are as follows:

|          |                    | KN   | % Wood Failure |
|----------|--------------------|------|----------------|
| Dry Test | Load               | 1.10 | 79.00          |
|          | Standard Deviation | 0.09 | 26.85          |
| Wet Test | Load               | 0.74 | 82.00          |
|          | Standard Deviation | 0.12 | 19.89          |

Thus, hot pressing produced plywood that gave high wood failure when tested. This formulation containing the furfuryl alcohol monomer shows excellent "boil resistance".

EXAMPLE 2

Three poplar veneer panels, each having a thickness of 4 mm., were obtained. The surface of one of the panels was coated on both sides with an adhesive composition having a reactive component and a catalyst component. The basic formulation of the reactive component was: furfuryl alcohol resin (43% by weight), lignin (22% by weight). The basic formulation of the catalyst component was: zinc chloride (2% by weight), iron (III) chloride hexahydrate (2% by weight), maleic anhydride (10% by weight), nut shell flour (11% by weight), and solvent (9% by weight).

After coating, the three poplar veneer panels were contacted in such a manner that the panel with the adhesive coating was between two uncoated panels. The tree-panel structure was then removed to a hot press which was maintained at a pressure of 1.2 mPa and a temperature of 150° C. The hot pressing continued for a time of seven minutes, at the end of which time the paned structure was removed from the hot press and allowed to cool.

To test the bonding quality, ten samples of 2.54 cm. Square area were cut from the panel structure and submitted to bond quality tests employing the U.S. National Bureau of Standards Voluntary Product Standard PS 1-83 for Construction and Industrial Plywood. Each of the samples was pulled apart by tension, subjecting the central square test area to rolling shear. The maximum load and amount of wood failure was recorded. Five of the samples were tested dry, and five of the samples were tested wet. The wet samples were boiled in water for 4 hours, dried, boiled again in water for 4 hours, and given a final drying.

The results of the test are as follows:

|  |  | KN | % Wood Failure |
|---|---|---|---|
| Dry Test | Load | 1.09 | 73.00 |
|  | Standard Deviation | 0.10 | 27.10 |
| Wet Test | Load | 0.61 | 65.00 |
|  | Standard Deviation | 0.07 | 25.06 |

Hot pressing produced plywood that gave high wood failure when tested.

We claim:

1. A two-part composition which can be mixed and used as a wood adhesive comprising:
   (a) a reactive component comprising furfuryl alcohol monomer and a by-product obtained from a chemical pulping process; and
   (b) a catalyst component comprising zinc chloride, iron (III) chloride hexahydrate and maleic anhydride.

2. A composition according to claim 1 wherein the by-product is a polymer mixture comprising lignin and a liquid solvent which is a member selected from the group consisting of water, an organic solvent and mixtures thereof.

3. A composition according to claim 1 wherein the catalyst component contains nut shell flour and methanol.

4. A composition according to claim 2 wherein the lignin is present in an amount of about 10% to about 30% by weight.

5. A composition according to claim 4 wherein the lignin is present in an amount of about 22% by weight.

6. A composition according to claim 1 wherein the furfuryl alcohol is present in an amount of about 30% to about 50% by weight.

7. A composition according to claim 6 wherein the furfuryl alcohol is present in an amount of about 43% by weight.

8. A composition according to claim 1 wherein the maleic anhydride is present in an amount of about 5% to about 15% by weight.

9. A composition according to claim 8 wherein the maleic anhydride is present in an amount of about 10% by weight.

10. A composition according to claim 1 wherein the zinc chloride is present in an amount of about 0.5% to about 5% by weight.

11. A composition according to claim 10 wherein the zinc chloride is present in an amount of about 2% by weight.

12. A composition according to claim 1 wherein the iron (III) chloride hexahydrate is present in an amount of about 0.5% to about 5% by weight.

13. A composition according to claim 12 wherein the iron (III) chloride hexahydrate is present in an amount of about 2% by weight.

14. A composition according to claim 3 wherein the nut shell flour is present in an amount of about 5% to about 20% by weight.

15. A composition according to claim 14 wherein the nut shell flour is present in an amount of about 11% by weight.

16. A process for bonding wooden substrates comprising the steps of:
    (a) obtaining two or more wooden substrates;
    (b) coating at least one of the wooden substrates with a two-part adhesive formulation comprising:
       1. a reactive component comprising furfuryl alcohol monomer and a by-product obtained from a chemical pulping process; and
       2. a catalyst component comprising zinc chloride, iron (III) chloride hexahydrate and maleic anhydride;
    (c) contacting the at least one coated substrate with a second wooden substrate to obtain a bondable wooden structure; and
    (d) heating the bondable wooden structure, optionally under pressure, to obtain a bonded wooden structure.

17. A process according to claim 16 wherein the by-product is a polymer mixture comprising lignin and a liquid solvent which is a member selected from the group consisting of water, an organic solvent and mixtures thereof.

18. A process according to claim 16 wherein step (d) is performed in a hot press under suitable conditions of temperature and pressure.

19. A process according to claim 17 wherein the lignin is present in an amount of about 10% to about 30% by weight.

20. A process according to claim 19 wherein the lignin is present in an amount of about 22% by weight.

21. A process according to claim 16 wherein the furfural alcohol is present in an amount of about 30% to about 50% by weight.

22. A process according to claim 21 wherein the furfuryl alcohol is present in an amount of about 43% by weight.

23. A process according to claim 16 wherein the maleic anhydride is present in an amount of about 5% to about 15% by weight.

24. A process according to claim 23 wherein the maleic anhydride is present in an amount of about 10% by weight.

25. A process according to claim 16 wherein the zinc chloride is present in an amount of about 0.5% to about 5% by weight.

26. A process according to claim 25 wherein the zinc chloride is present in an amount of about 2% by weight.

27. A process according to claim 16 wherein the iron (III) chloride hexahydrate is present in an amount of about 0.5% to about 5% by weight.

28. A process according to claim 27 wherein the iron (m) chloride hexahydrate is present in an amount of about 2% by weight.

29. A process according to claim 16 wherein the catalyst component contains nut shell flour and methanol.

30. A process according to claim 29 wherein the nut shell flour is present in an amount of about 5% to about 20% by weight.

31. A process according to claim 30 wherein the nut shell flour is present in an amount of about 11% by weight.

32. A process according to claim 16 wherein the wooden substrate is a member selected from the group consisting of lumber, veneer, plywood, wood wafers and wood particles and wood fibres.

33. A bonded wooden structure made according to the process of claim 16.

34. In the process of preparing composite articles wherein a binder is employed, the improvement consisting of employing as the binder a composition comprising furfuryl alcohol monomer, a by-product obtained from a chemical pulping process, zinc chloride, iron (III) chloride hexahydrate and maleic anhydride.

35. In the process of preparing glass fiber reinforced articles wherein a binder is employed, the improvement consisting of employing as the binder a composition comprising furfuryl alcohol monomer, a by-product obtained from a chemical pulping process, zinc chloride, iron (III) chloride hexahydrate and maleic anhydride.

* * * * *